United States Patent [19]

Block et al.

[11] Patent Number: 4,850,044
[45] Date of Patent: Jul. 18, 1989

[54] SERIAL OPTICAL INTERCONNECT BUS FOR LOGIC CARDS AND THE LIKE

[75] Inventors: Timothy R. Block; Ronald L. Soderstrom, both of Rochester; Gerald M. Heiling, Pine Island; Charles J. Rocca, Rochester, all of Minn.

[73] Assignee: International Business Machines Corporation, Armonk, N.Y.

[21] Appl. No.: 210,364

[22] Filed: Jun. 23, 1988

[51] Int. Cl.⁴ .............................................. H04B 9/00
[52] U.S. Cl. .................................. 455/607; 455/601; 455/609
[58] Field of Search ............... 455/600, 601, 606, 607, 455/609, 613, 617; 350/96.11

[56] References Cited

U.S. PATENT DOCUMENTS

| | | | |
|---|---|---|---|
| 4,063,083 | 12/1977 | Cathey et al. | 45/607 |
| 4,161,650 | 1/1979 | Caouette et al. | 455/612 |
| 4,358,858 | 11/1982 | Tamura et al. | 455/607 |
| 4,393,515 | 7/1983 | de Neumann | 455/606 |
| 4,449,206 | 5/1984 | Tokitsu et al. | 455/606 |
| 4,494,185 | 1/1985 | Gunderson et al. | 455/607 |
| 4,499,607 | 2/1985 | Higgins | 45/606 |
| 4,499,608 | 2/1985 | Broockman et al. | 45/607 |
| 4,527,285 | 7/1985 | Kekas et al. | 455/602 |
| 4,566,134 | 1/1986 | Harbour et al. | 455/612 |
| 4,682,323 | 7/1987 | Corfield et al. | 455/607 |
| 4,720,634 | 1/1988 | D'Auria et al. | 455/607 |

FOREIGN PATENT DOCUMENTS

| | | | |
|---|---|---|---|
| 0051637 | 3/1983 | Japan | 455/617 |
| 0139285 | 8/1983 | Japan | 455/613 |
| 0126335 | 7/1984 | Japan | 455/607 |
| 0169237 | 9/1984 | Japan | 455/607 |
| 0088624 | 5/1986 | Japan | 455/617 |

OTHER PUBLICATIONS

Balliet et al.; *IBM Technical Disclosure Bulletin;* "Optical Transmission System for Interconnecting Electronic Units"; vol. 26, No. 4; Sep. 83; pp. 1793-1796.

Primary Examiner—Robert L. Griffin
Assistant Examiner—Andrew J. Telesz, Jr.
Attorney, Agent, or Firm—Hugh D. Jaeger; Carl W. Laumann, Jr.

[57] ABSTRACT

An optical serial data bus for connecting logic cards used in a data processing system. The bus uses semiconductor lasers and PIN diodes as transmitters and receivers, transmitting through free space without the use of lenses or other optical elements. Each logic card communicates only with the adjacent cards on either side to minimize the transmission distance.

13 Claims, 7 Drawing Sheets

SERIAL OPTICAL INTERCONNECT BUS FOR LOGIC CARDS AND THE LIKE

TECHNICAL FIELD

This invention relates to an optical serial data bus particularly adapted for use in establishing a non-wired data communications link between logic cards used in a data processing system. The optical data bus is implemented with semiconductor lasers for transmitters and PIN diodes for receivers. The bus is configured in a loop to provide bi-directional communications capability.

BACKGROUND ART

The development of very large scale integrated circuits (VLSI) has substantially increased the circuit content of logic cards used in data processing systems. With more circuits, there is an attendant need for more signal connections to the card. The problem was addressed in the early stages of development of the so-called "personal computer" by connecting each card to a bus structure. This bus allowed the circuits on a card to communicate with circuits on another card. The various engineering trade-offs involving circuit cost and performance led to the adoption of a parallel bus architecture. Unfortunately, the parallel arrangement, while providing good performance, also carries the need for a large number of connections. Since there is a practical limit to the number of connections which can be economically made to a single logic card, one solution involves the use of a high speed serial data bus. This reduces the number of connections required, but introduces higher cost.

The problem is further complicated by the fact that many data processing systems have variable configurations. That is, they may be shipped from the manufacturer to the user with a given configuration including certain logic cards. The customer may then add other logic cards to enable the system to better satisfy his particular data processing requirements. This means that any bus structure must accommodate the installation of logic cards by an unskilled person, which rules out the use of otherwise viable approaches. For example, high speed data transfer is achievable with optical devices connected by fiber optic cables, but these require the use of sophisticated connectors which cannot be reliably installed by unskilled persons. Alternatively, an optical data bus can be implemented with lenses instead of fiber optic cables, but these require precise alignment, which may not be possible by unskilled installers, and are much more expensive to implement.

Despite these shortcomings, the development of low cost semiconductor lasers and high speed photosensitive devices such as PIN diodes has made optical transmission of data competitive with hard wired systems. The great band width which may be achieved with optical transmission systems, their immunity to electrical noise and absence of cross talk and spurious emissions have led to widespread adoption of such systems in the data processing and communications environments.

U.S. Pat. No. 4,063,083 to Cathey and Smith describes a data communications system for transfer of data between printed circuit logic cards in a data processing system. LED transmitters are positioned to illuminate receptors and apertures in a fashion to provide a parallel data bus connection with all logic cards in a system. The bus is implemented with an appendage to the conventional logic card. The appendage carries the requisite LED's, lenses, photoreceptors and apertures. The system of the patent provides a parallel data bus. Although the system works in free space, and therefore does not require fiber optic elements, it requires lenses, a high degree of precision in alignment of the logic cards, and is not adapted for use within the confines of a conventional logic card. In contrast, the system of this invention is directed to a serial data bus which is implemented without the use of lenses and can be implemented within the confines of a conventional logic card without the need for precise alignment.

U.S. Pat. No. 4,161,650 to Cauette et al. shows a bi-directional fiber optic data communications link. LEDs are used as transmitters and photo diodes as detectors. Fiber optic elements in the interconnect cable carry a serial data signal, clock, and control signals. A conventional electrical conductor, packaged with the fiber optic elements, carries power to the remote station. The system of this invention differs since the optical bus is implemented in free space without fiber optic elements.

U.S. Pat. No. 4,358,858 to Tamura et al. is directed to an optical data communications system in which the transmitters and receivers of all stations are physically arranged to transmit light to, and receive light from, a common mirror. In this fashion all stations can communicate with all other stations without the need for fiber optic elements. In contrast, the optical bus system of this invention is implemented in loop fashion, where each station directly communicates with only the stations on either side. Further, the system of this invention does not require optical alignment beyond the precision afforded by the usual card socket and frame used in conventional logic card support.

U.S. Pat. No. 4,494,185 to Gunderson et al. relates to an optical implementation of broadcast packet switching in which a pair of fiber optic lines connect each station to a star coupler, which provides the bidirectional capability by connecting one of the fiber optic lines to the other. In the system of the invention claimed herein, transmission occurs in free space, without the use of fiber optic elements, and each card can communicate with only the card on either side.

U.S. Pat. No. 4,527,285 to Kekas el al. describes a terminal packaging technique which provides space dedicated to the use of optical transmission between modular units of the terminal. The patent does not describe the optical data communications system.

U.S. Pat. No. 4,566,134 to Harbour et al. shows a system for interconnecting modular terminals of the type described in U.S. Pat. No. 4,527,285. Fiber optic cables are coupled to the optical signal which exists in the dedicated space. In turn, the coupled fiber optic cables lead to the remote terminal devices. The claimed invention does not require the use of fiber optic cables, and is directed to a loop arrangement, not the broadcast system of the reference.

U.S. Pat. No. 4,499,608 to Broockman et al. describes a terminal having an optical chamber in which each modular unit of the terminal communicates directly with the other units by reflecting the signals off a mirror. The claimed invention differs in that each unit communicates only with the units on either side to provide a loop arrangement rather than the broadcast configuration of the reference.

U.S. Pat. No. 4,449,206 to Tokitsu et al. is directed to a portable semiconductor memory system in which address and data information is transmitted between the memory and a data processing system by an optical data link. The claimed invention is distinguished by the existence of a logic card which can communicate with the cards on either side without the need for lenses or optical fibers.

U.S. Pat. No. 4,393,515 to de Neumann relates to a multi-processor arrangement in which all the processors communicate with all other processors by means of optical signals transmitted and received through a device which includes a conical prism. The claimed invention differs since each logic card can communicate only with the cards on either side and no prisms or lenses are required.

U.S Pat. No. 4,499,607 to Higgins shows a semiconductor chip assembly in which the chip-to-chip signal transmission is achieved with optical transducers located at the edge faces of the chips. The patent does not show logic cards with optical transducers on opposite sides thereof as claimed herein.

Japanese Pat. No. 58-139285 (A) to Kominame relates to a card which carries an integrated circuit and a reader for the card which communicates by optical means. The card-reader system of the patent does not relate to the optical data bus communication system for logic cards as claimed herein.

Japanese Pat. No. 59-126335 (A) to Kawarazuka describes an optical data bus for use in a record player. The data bus includes an optical transmission element having appropriately positioned prisms which serve to disperse the radiation in the transmission element to allow reception by a plurality of photodetecting elements. The claimed system distinguishes by the absence of such elements as dispersing prisms.

Japanese Pat. No. 59-169237 (A) to Morimoto relates to an optical communications system for a portable terminal. The system of this patent does not include an optical data communications system for the interconnection of logic cards as claimed herein.

IBM Technical Disclosure Bulletin Vol. 26, No. 4, Sept. 1983, pp 1793-1796, Balliet and Cowden, shows an electronic unit optical interconnecting system which uses a pair of conical prisms at each unit to disperse and acquire optical beams for transmission and reception. In this fashion, each unit is able to directly communicate with all other units. In contrast, the claimed system does not require the use of optical elements such as prisms and provides direct communication with only the adjacent devices.

DISCLOSURE OF THE INVENTION

It is therefore an object of this invention to provide an optical data bus for communication between logic cards in a data processing system.

It is another object of the invention to provide an optical data bus which does not require precise alignment, fiber optic elements or lenses.

Still another object of this invention is to provide a serial optical data bus for loop communication between logic cards in a data processing system.

It is still another object of this invention to provide a serial optical data bus for loop communication between adjacent logic cards in a data processing system.

Yet another object of this invention is to provide a serial optical data bus for loop communication between logic cards which uses transmitters and receivers mounted within the confines of a conventional logic card mounted in a conventional logic card cage or frame.

According to one aspect of the invention, there is provided a serial optical data bus, for communication between logic cards in a data processing system, which uses semiconductor lasers operating in either the short wavelength range (780 nm–900nm), or the long wavelength range (1280nm–1550nm), as transmitters and PIN diodes as receivers. Each logic card in the system contains two transmitter-receiver pairs positioned to co-act with the transmitter-receiver pairs on the adjacent logic cards. Each pair functions to receive, originate and relay information in one direction so that the two pairs combine to provide bi-directional capability. Where full loop capability is desired, the pairs on the logic cards at the ends of the logic card frame can be electrically connected with a bypass switch function or optically connected with a mirror or equivalent device. No lenses or other costly optical devices are required for implementation of the invention. Further, the mounting precision provided by the conventional logic card socket and guides provides adequate alignment, and no further collimation is required. The semiconductor lasers and PIN diodes may be solder mounted on the logic card in accordance with conventional techniques.

The foregoing and other objects, features and advantages of the invention will be apparent from the following more particular description of the preferred embodiments of the invention as illustrated in the accompanying drawings.

DESCRIPTION OF THE INVENTION

Figure 1:
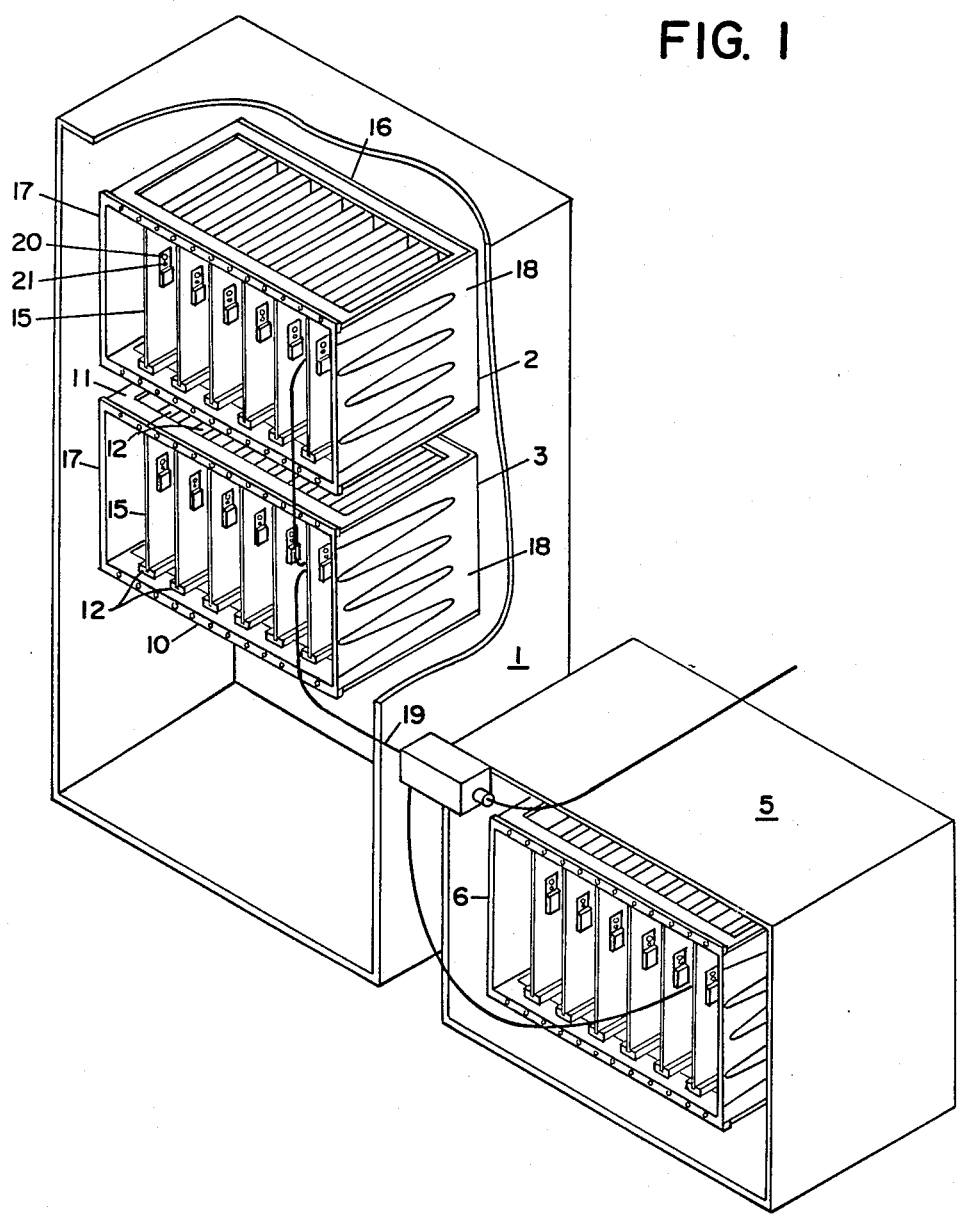
FIG. 1 is an isometric view of data processing system logic card cages, with parts cut away, showing logic cards having a serial optical communications bus of the invention.

With reference to FIG. 1, the serial optical interconnect bus of this invention is shown as implemented within logic card enclosure 1 which has logic card mounting frames 2 and 3 positioned therein. A second logic card enclosure 5 has a logic card mounting frame 6 positioned therein. The logic card mounting frames 2, 3 and 6 are generally of the same type. Each mounting frame has bottom portion 10 and a top portion 11, each having guides 12 which contain slots to accommodate the logic cards 15. The slots are configured to guide logic cards 15 into sockets, not shown, mounted on rear wall 16 and hold the cards in closed-spaced parallel arrangement as shown. Each logic card mounting frame has end walls 17 and 18 to provide a rigid support for the logic cards 15.

Each logic card 15 contains a photo detector 20, such as a PIN diode, and a 780nm semiconductor laser 21 on a first side thereof and a second PIN diode and laser, not shown in FIG. 1, on the opposite side. The arrangement of PIN diodes and lasers is better shown in FIG. 2. Each logic card 15 has PIN diode photodetectors 20a-20f and semiconductor lasers 21a-21f mounted on a first side thereof. Each logic card 15 has a complementary set of PIN diode photodetectors 22a-22f and semiconductor lasers 23a-23f mounted on a second side thereof. The lasers and PIN diodes are mounted at the same geometric coordinates of each of the logic cards 15a-15f so that the radiation emitted by the semiconductor lasers impinges on the PIN diodes of the adjacent cards. For example, the radiation emitted by semiconductor laser 23b, mounted on logic card 15b, impinges on PIN diode 20a mounted on adjacent logic card 15a. In like fashion, the radiation emitted by semiconductor laser 21b, also mounted on logic card 15b, impinges on PIN diode 22c mounted on adjacent logic card 15c.

The semiconductor lasers emit radiation which emerges in a diverging beam, and the spacing between logic cards 15a-15f is relatively close, thereby obviating the need for lenses or other optical devices, such as fibers, to convey the radiation from one card to another. It will be appreciated that inexpensive, non-precision, lenses may be used where it is desired to project the beam long distances; for example, across the interior of a logic card frame. The divergent beam also eliminates the need for collimation or adjustment of the position of the logic cards since the logic card guides 12 provide all the positional accuracy which is required. If desired, a conventional optical fiber network 19 may be connected to the optical data bus.

Figure 2:
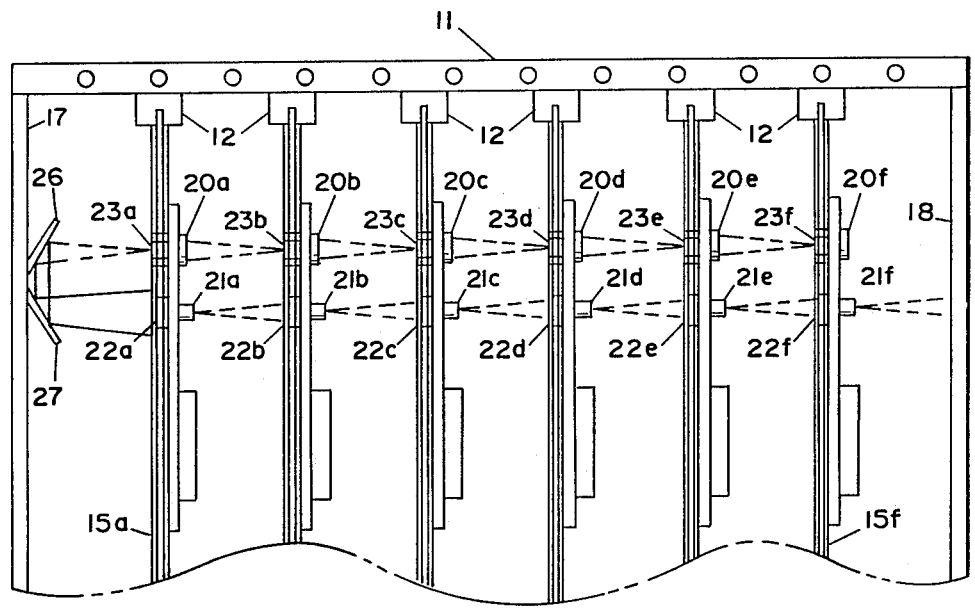
FIG. 2 is front view of an open logic card cage showing the arrangement of the lasers and PIN diodes used in the serial optical communications bus of the invention.

With reference to FIG. 2, the laser 23a and PIN diode 22a, mounted on the second side of logic card 15a are optically connected by means of mirrors 26 and 27. These mirrors are positioned to reflect the radiation emitted by laser 23a so that it impinges on PIN diode 22a. Although two mirrors are shown for the purpose of description, it will be appreciated that a single mirror configuration or other retro-reflecting device may suffice. The configuration as shown with single mirror 28 mounted on end wall 18 to reflect radiation emitted from laser 21f to PIN diode 20f mounted on logic card 15f, is also possible where the geometry of the enclosure, the divergence of the beam emitted by laser 21f and the angle of acceptance of PIN diode 20f permit.

The lasers 23a-23f, operating in conjunction with PIN diodes 20a-20f, create an optical data bus capable of transmitting data in the direction of right to left; that is, in the direction from logic card 15f toward logic card 15a. The lasers 21a-21f create an optical data bus capable of transmitting data in the direction of left to right; that is, from logic card 15a toward logic card 15f. The function of the mirrors is to complete the optical circuit to form a loop configuration.

Figure 3A:
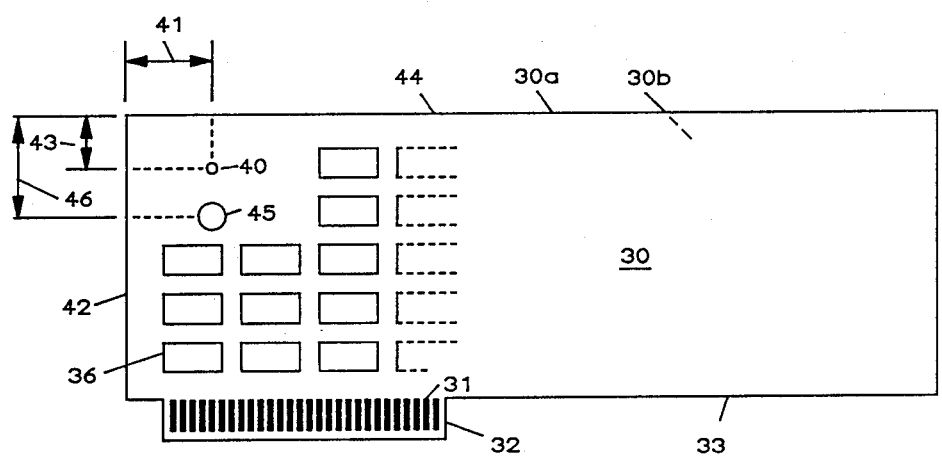
FIG. 3a is a side view of a logic card showing the position of a laser and PIN diode used in the serial optical communications bus of the invention.
Figure 3B:
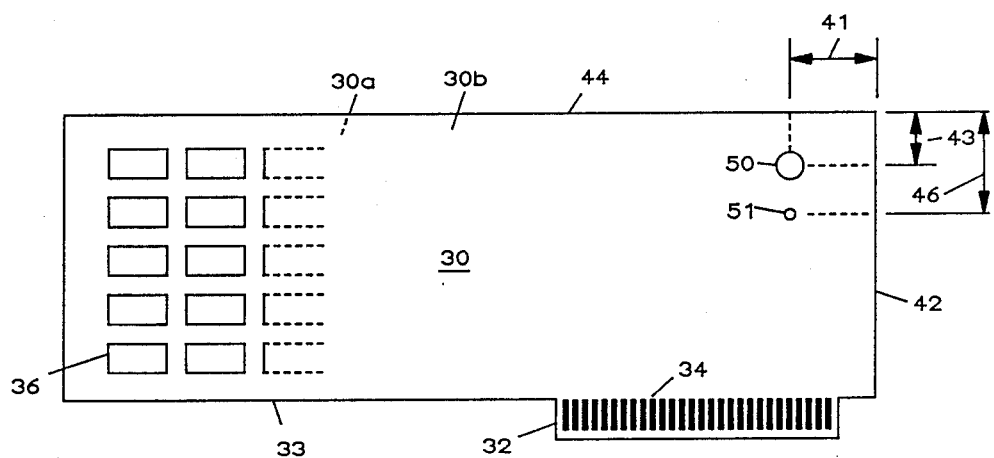
FIG. 3b is a side view of the opposite side of the logic card shown in FIG. 3a showing the position of the other laser and PIN diode used in the serial optical communications bus of the invention.

The geometry of the position of the lasers and PIN diodes is described with reference to FIGS. 3a-3d. The logic card 30 of FIGS. 3a and 3b is similar to that of the well known "personal computer". This card is relatively narrow and has a first side 30a having electrical contacts 31 positioned on a pluggable tab 32 which extends from one of the long edges 33. The laser diode 40 is positioned a distance 41 from a short edge 42 and a distance 43 from the other long edge 44. The photosensitive PIN diode 45 is also positioned a distance 41 from the short edge 42, but is located a distance 46 from the long edge 44.

The second side 30b of logic card 30 is shown in FIG. 3b. The tab 32 extending from side 33 has a second set of electrical contacts 34, which, in conjunction with contacts 31, serves to electrically connect the circuitry on the card to the rest of the data processing system in conventional fashion. It will be appreciated that either, or both, logic card sides 30a and 30b will carry a variety of semiconductor devices 36 and an interconnecting pattern of conductive lands.

Photosensitive PIN diode 50 is positioned on side 30b of logic card 30 at a distance 41 from short edge 42 and a distance 43 from long edge 44. The semiconductor laser 51 is also positioned a distance 41 from short edge 42 and a distance 46 from the long edge 44.

The physical arrangement of the PIN diodes and semiconductor lasers is such that laser 40 is mounted on the other side of the card exactly opposite PIN diode 50 and PIN diode 45 is mounted on the other side of the card exactly opposite laser 51. The laser 40 and PIN diode 50 comprise a first optical data transmitter-receiver pair, and the PIN diode 45 and laser 51 comprise a second optical data transmitter-receiver pair. Since these pairs are placed in the same position on the logic cards, they are in alignment when the cards are plugged into sockets in a card support frame such as that shown in FIG. 1.

Figure 3C:
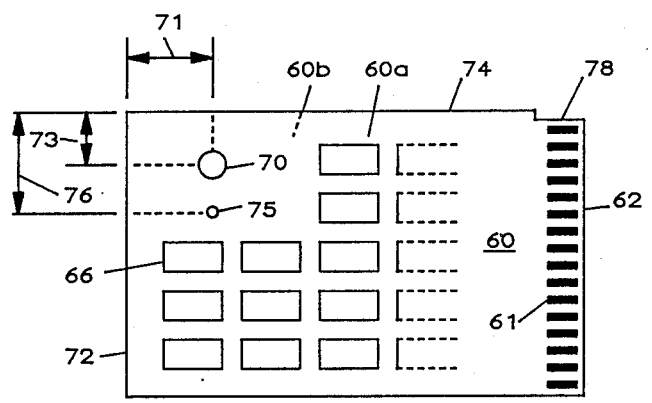
FIG. 3c is a side view of a logic card of the type shown in FIG. 1 showing the position of a laser and PIN diode used in the serial optical communications bus of the invention.

FIG. 3c shows a logic card 60 having as first side 60a and a second side 60b. A pluggable end tab portion 62 has a plurality of contacts 61 which are connected to the pattern of lands, not shown, leading to semiconductor devices 66 mounted on the card. The photosensitive PIN diode 70 is positioned a distance 71 from short edge 72 and a distance 73 from long edge 74. The semiconductor laser 75 is also positioned a distance 71 from the short edge 72, but is located a distance 76 from the long edge 74.

Figure 3D:
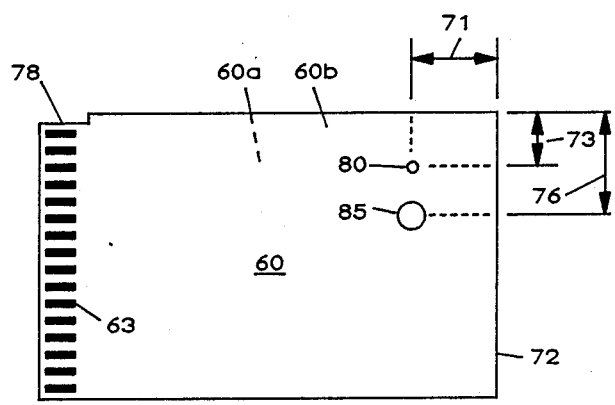
FIG. 3d is a side view of the opposite side of the logic card shown in FIG. 3c showing the position of a laser and a PIN diode used in the serial optical communications bus of the invention.

FIG. 3d shows the second side 60b of logic card 60 having a second set of electrical contacts 63, also connected to the land pattern not shown, on the tab portion 62. The semiconductor laser 80 is positioned a distance 71 from short edge 72 and a distance 73 from long edge 74. The photosensitive PIN diode 85 is also positioned a distance 71 from short edge 72, but is located a distance 76 from long edge 74.

As in the case with the card shown in FIGS. 3a and 3b, the physical arrangement of the PIN diodes and semiconductor lasers is such that the PIN diode 70 is mounted on the other side of the card exactly opposite semiconductor laser 80, and semiconductor laser 75 is mounted on the other side of the card exactly opposite PIN diode 85. The PIN diode 70 and semiconductor laser 80 comprise a first optical data transmitter-receiver pair, and the semiconductor laser 75 and PIN diode 85 comprise a second optical data transmitter-receiver pair.

The logic cards are polarized to ensure that the lasers and PIN diodes are properly positioned. The logic card shown in FIGS. 3a and 3b is polarized by the position of the tab 32. The logic card of FIGS. 3c and 3d is polarized by the small notch 79 which co-acts with a complementary portion of the card socket into which the card is plugged. Other polarization methods may also be used. In the event that a non-mechanical system is desired, the card may contain a visible mark or color code indicating which side is to go to the right or left.

Figure 4:
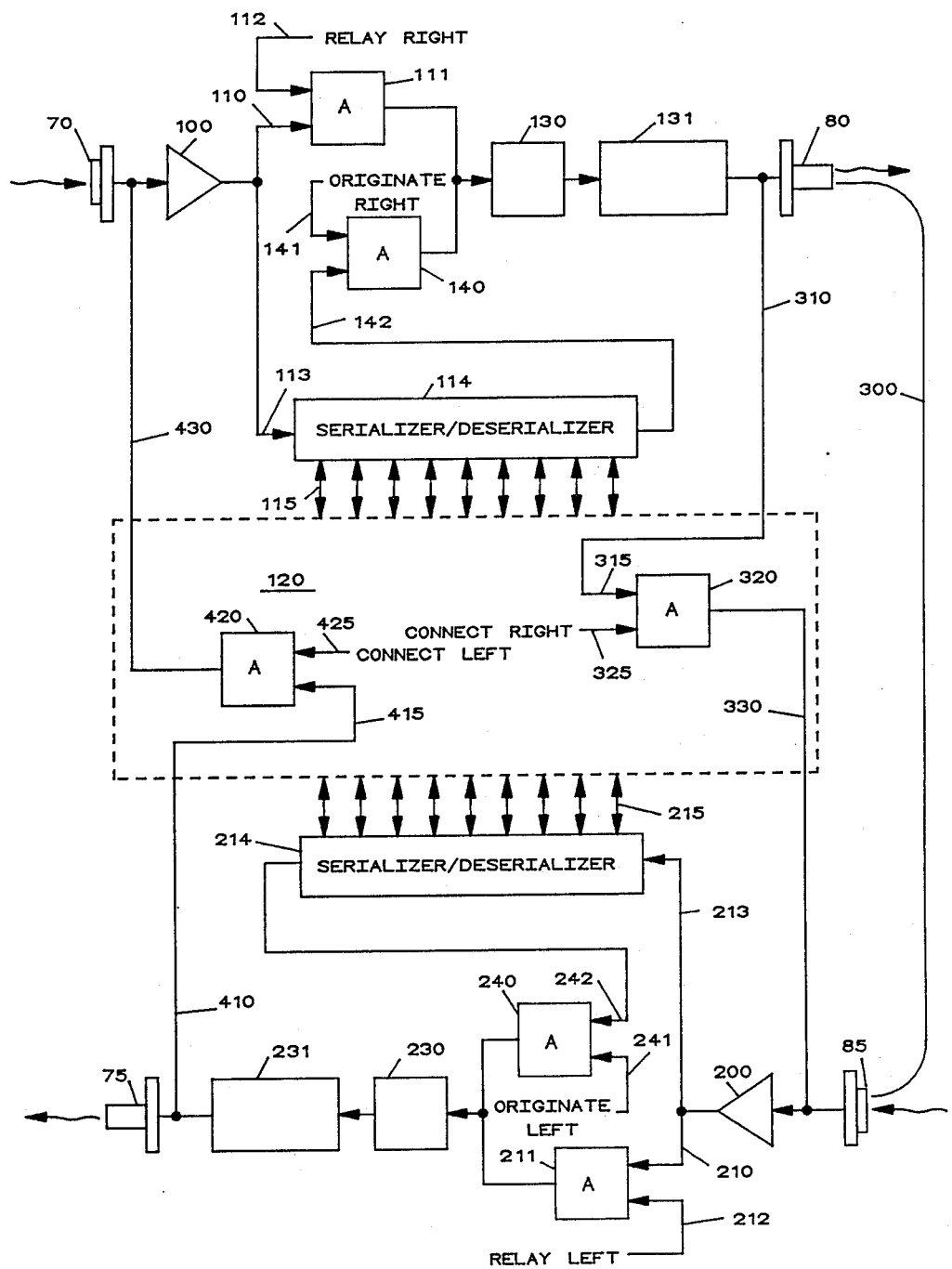
FIG. 4 is a schematic drawing of the logic card circuitry associated with the lasers and PIN diodes.

The electronic circuits associated with the optical serial data bus are shown in the schematic diagram of FIG. 4. These circuits function to receive the optical wave modulated with the data being transmitted, reshape and amplify the signal to appropriately modulate the optical wave transmitted from the card in the same direction as the received wave, convert the received signal from a serial signal to a parallel signal. The circuits would also include appropriate control logic to implement the communication protocol selected for operation of the loop or other communications configuration.

As shown in FIG. 4, photosensitive PIN diode 70, which receives a modulated optical wave from the next adjacent card to the left, is connected to the input of amplifier 100 having an output connected to a first input 110, AND gate 111 and to the serial input 113 of the serializer/deserializer (SERDES) 114. The parallel inputs/outputs 115 of SERDES 114 are connected to the other circuits 120 on the logic card. These circuits may include semiconductor storage devices, logic circuits, microprocessors and similar devices. Various of the circuits 120 are used to generate control signals for the electronic circuits associated with the optical serial data bus. In the event that the signal received at PIN diode 70 is to be transmitted to the next adjacent logic card to the right without modification, the control circuitry generates a Relay Right signal which is applied to the second input 112 of AND gate 111. This causes the amplified modulated signal to be applied to the wave shaping circuit 130 and then to amplifier 131 which drives semiconductor laser 80.

In the event that the circuitry 120 has originated data which is to be placed on the optical data bus and transmitted to the adjacent logic card on the right side, the control signal Originate Right is generated by the circuitry and applied to input 141 of AND gate 140, serving to pass serial data on line 142 representing data previously transferred to SERDES 114 over signal lines 115. From AND gate 140, the data passes in the same fashion as data which is relayed.

A complementary set of circuits effects the same control action for the PIN diode 85 and laser 75 used to receive and transmit data to left.

Photosensitive PIN diode 85 is connected to the input of amplifier 200 having an output connected to the serial input 213 of SERDES 214. The parallel inputs/outputs 215 of SERDES 214 are connected to the other circuits 120 on the logic card.

When the signal received at PIN diode 85 from the next adjacent card to the right is to be transmitted to the next adjacent logic card to the left, the control circuitry portion of circuitry 120 generates a Relay Left signal which is applied to the second input 212 of AND gate 211. This causes the amplified modulated signal to be applied to the wave shaping circuit 230 and then to amplifier 231 which drives the semiconductor laser 75.

In the event that the circuitry 120 has originated data which is to be placed on the optical data bus and transmitted to the adjacent logic card on the left side, the control signal Originate Left is generated by the circuitry and applied to the input 241 of AND gate 240, serving to pass serial data on line 242 representing data previously transferred to SERDES 214 over parallel signal lines 215. From AND gate 240, the data passes in the same fashion as data which is relayed.

Although it is contemplated that the usual installation will include mirrors mounted at the ends of the card frame to close the loop by reflecting the beam back onto the PIN diode, it is also possible to mount a fiber optic element on the last card in such fashion as to conduct the light emitted by the laser to the region of the PIN diode. This is shown schematically in FIG. 4 with the fiber optic element 300 extending from laser 80 to PIN diode 85. The fiber optic element 300 would be put in place before the logic card is plugged into the card frame.

It is also possible to close the loop electrically by connecting the output signal used to drive laser 80 to the input of amplifier 200. As shown in FIG. 4, the signal used to drive the laser 80 is connected over lead 310 to input 315 of AND gate 320. When the other input 325 is conditioned by a Connect Right signal developed by the control circuitry, the output signal is passed on line 330 to the input of amplifier 200. This completes the connection between the left going and right going busses.

In the event that the logic card is placed in the leftmost position, the signal used to drive laser 75 is connected over lead 410 to input 415 of AND gate 420. The other input 425 is conditioned by a Connect Left signal produced by the control circuitry and the output signal passes over line 430 to the input of amplifier 100, effectively completing the connection between laser 75 and PIN diode 70.

The Connect Right and Connect Left signals can be developed various ways. For example, when the data processing system is powered on, the initialization and test routine can interrogate each of the card slots in the logic card mounting frame and determine which is the leftmost card and which is the rightmost card. Signals can be developed by the initialization program and transmitted to the leftmost and rightmost cards to develop the Connect Left and Connect Right signals. The signal could be sent to the card either electrically or by the optical data bus.

We claim:

1. In a data processing system having a plurality of logic cards parallel mounted in a supporting frame, optical serial data bus means connecting said cards comprising:
    a. each of said cards so connected containing a first, electrically connected, optical data receiver-transmitter pair with the optical transmitter on a first side of said card and a second, electrically connected, optical data receiver-transmitter pair with the optical transmitter on a second, opposite side of said card;
    b. said first optical transmitter-receiver pairs positioned on said logic cards to provide alignment therebetween when said cards are mounted in a supporting frame;
    c. said second optical transmitter-receiver pairs positioned on said logic cards to provide alignment therebetween when said cards are mounted in a supporting frame;
    d. each of said optical receivers positioned to receive data optically transmitted in free space from a single one of said logic cards;
    e. each of said optical transmitters positioned to transmit data optically in free space to a single one of said logic cards; and, f. whereby said first pairs co-act to provide data transmission between said logic cards in a first direction, and said second pairs co-act to provide data transmission between said cards in a second direction.

2. An optical data bus according to claim 1 wherein the first and second pairs on the logic cards at the ends of said frame include optical connections to form a loop.

3. An optical data bus according to claim 2 wherein said optical connections comprise mirror means supported on said frame.

4. An optical data bus according to claim 2 wherein said optical connections comprise fiber optic elements.

5. A optical data bus according to claim 1 wherein said optical transmitters comprise semiconductor lasers operating in the 780 nm range.

6. An optical data bus according to claim 5 wherein said optical receivers comprise PIN diodes.

7. An optical data bus according to claim 1 wherein the first and second pairs on the logic cards at the ends of said frame are electrically connected to form a loop.

8. An optical data bus according to claim 1 wherein said optical receivers comprise PIN diodes.

9. A planar logic card for use in a data processing system comprising:
   a. a first side of said logic card having a first semiconductor laser and a first optical receiver positioned thereon at first and second spaced apart locations;
   b. a second side of said logic card having a second semiconductor laser and a second optical receiver positioned thereon at third and fourth spaced apart locations geometrically corresponding to said second and first locations, respectively;
   c. first circuit means electrically connecting said first laser and said second optical receiver; and,
   d. second circuit means electrically connecting said second laser and said first optical receiver whereby said card is adapted to utilize, modify or relay data optically transmitted to said first or second optical receivers.

10. A planar logic card according to claim 9 wherein said logic card is polarized to restrict mounting to a single position whereby said first second, third and fourth locations are respectively positioned abutting the third and fourth locations of a card adjacent said first side and abutting the first and second locations of a card adjacent said second side to receive data optically transmitted in flee space from said adjacent cards and to transmit data optically in free space to said adjacent cards.

11. A logic card according to claim 10 wherein said first laser and said second optical receiver are located at a same first coordinate on opposite sides of said card.

12. A logic card according to claim 11 wherein said second laser and said first optical receiver are located at a same second coordinate, spaced apart from said first coordinate, on opposite sides of said card.

13. A logic card according to claim 10 wherein said semiconductor lasers operate in the region of 780 nm, and said optical receivers are PIN diodes.

* * * * *